United States Patent [19]

Stiller

[11] 3,917,887
[45] Nov. 4, 1975

[54] PROCESS FOR DYEING OXIDE LAYERS ON ALUMINUM AND ALUMINUM ALLOYS

[75] Inventor: Frank P. Stiller, Randolph Township, N.J.

[73] Assignee: Sandoz, Inc., E. Hanover, N.J.

[22] Filed: Jan. 24, 1974

[21] Appl. No.: 436,130

[52] U.S. Cl. .............. 427/343; 148/6.1; 204/35 N; 204/58; 260/159; 260/171
[51] Int. Cl.² C25D 11/24; C23F 5/04; C09B 35/46
[58] Field of Search .......... 204/35 N; 260/159, 171; 148/6.1

[56] References Cited
UNITED STATES PATENTS

| | | | |
|---|---|---|---|
| 2,236,549 | 4/1941 | Darsey et al. ........................ | 148/6.1 |
| 2,237,483 | 4/1941 | Graenacher et al. ................ | 148/6.1 |
| 2,833,756 | 5/1958 | Fleischhauer ...................... | 260/171 |
| 2,966,483 | 12/1960 | Gies .................................. | 260/171 |
| 3,058,855 | 10/1962 | Kirby, Jr. et al. .................... | 148/6.1 |
| 3,172,786 | 3/1965 | Kirby, Jr. et al. .................... | 148/6.1 |
| 3,202,550 | 8/1965 | Grossmann et al. ................. | 148/6.1 |
| 3,291,651 | 12/1966 | Brassel ............................... | 148/6.1 |
| 3,515,598 | 6/1970 | Schenkel ............................ | 148/6.1 |

FOREIGN PATENTS OR APPLICATIONS 1,022,751   3/1966   United Kingdom................. 148/6.1

OTHER PUBLICATIONS

Wernick and Pinner, "Surface Treatment of Aluminum", Draper Ltd., London, 3rd Ed., (1964), Chap. 10.

Primary Examiner—John H. Mack
Assistant Examiner—Aaron Weisstuch
Attorney, Agent, or Firm—Gerald D. Sharkin; Richard E. Vila; Melvyn M. Kassenoff

[57] ABSTRACT

Dyes of the formula

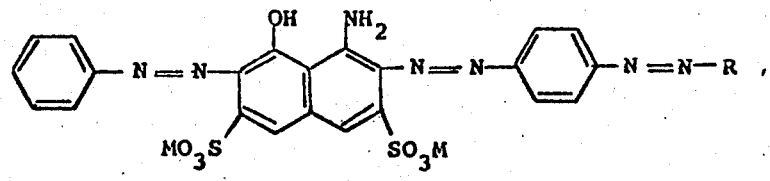

are useful for dyeing aluminum oxide layers, e.g., those produced on aluminum and alloys thereof by anodization.

35 Claims, No Drawings

PROCESS FOR DYEING OXIDE LAYERS ON ALUMINUM AND ALUMINUM ALLOYS

This invention relates to the use of dyes of the formula

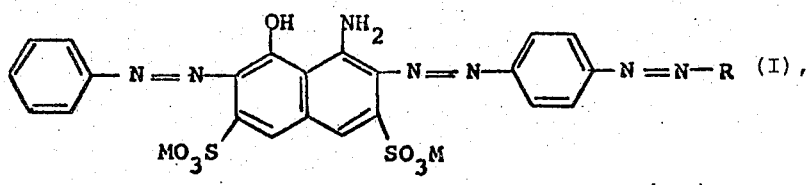  (I), wherein R is (a) 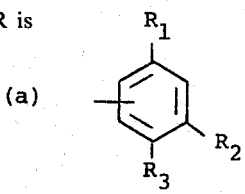

wherein
R$_1$ is amino, anilino or toluidino,
R$_2$ is hydroxy or amino, and
R$_3$ is hydrogen, nitro, —SO$_3$M or alkyl, with the proviso that R$_3$ must be hydrogen unless both R$_1$ and R$_2$ are amino, (b) 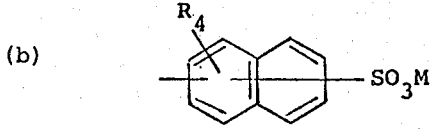

wherein
R$_4$ is hydroxy, amino, anilino or toluidino, (c) 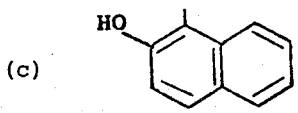 , (d) 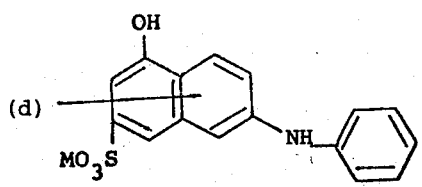 , (e) 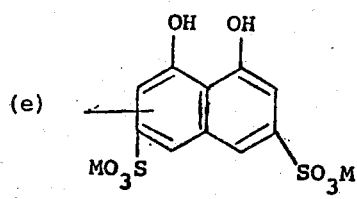 , (f) 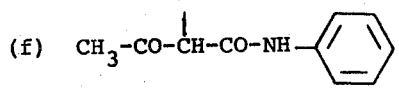 , (g) 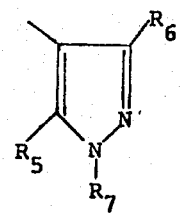 , wherein
R$_5$ is hydroxy, alkylsulfonyloxy, phenylsulfonyloxy, amino, alkylsulfonylamino or phenylsulfonylamino,
R$_6$ is alkyl, alkoxy, acetyl, carboxy or carbamoyl, and
R$_7$ is hydrogen, acyl, alkyl, substituted alkyl, phenyl, substituted phenyl, naphthyl or substituted naphthyl, or (h) 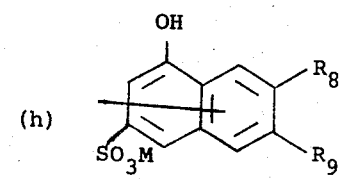 , wherein
R$_8$ is hydrogen or amino, and
R$_9$ is hydrogen or amino, with the proviso that one of R$_8$ and R$_9$ is amino and the other is hydrogen, and each M is independently hydrogen or an equivalent of a non-chromophoric cation, for dyeing artificially produced oxide layers on the surface of aluminum or an aluminum alloy, i.e., layers produced by chemical or, preferably, anodizing processes, preferably in aqueous solutions.

In the foregoing formula,
R$_4$ is preferably hydroxy or amino,
R$_5$ is preferably hydroxy, and
R$_6$ is preferably n-alkyl, most preferably methyl.

Where R$_7$ is acyl, it is preferably alkylcarbonyl wherein the alkyl radical has 1 to 6 carbon atoms, more preferably 1 to 3 carbon atoms, or benzoyl.

Where R$_7$ is substituted alkyl, it is preferably alkyl of 1 to 6 carbon atoms substituted by 1 or 2 substituents, wherein each substituent is independently alkoxy, chloro, cyano or hydroxy and more preferably is monosubstituted.

Where R$_7$ is substituted phenyl, it is preferably substituted phenyl having 1 to 3 substituents wherein each substituent is independently halo, alkyl, alkoxy, nitro, cyano, amino or —SO$_3$M. More preferably, it is substituted phenyl having 1 to 3 substituents wherein each substituent is independently halo, alkyl or alkoxy, or monosubstituted phenyl wherein the substituent is nitro, cyano, amino or —SO$_3$M. Most preferably, it is monosubstituted phenyl wherein the substituent is —SO$_3$M, wherein M is preferably hydrogen or sodium.

Where R$_7$ is substituted naphthyl, it is preferably substituted naphthyl having 1 or 2 substituents wherein each substituent is independently —SO$_3$M, preferably —SO$_3$H or SO$_3$Na.

Each alkyl, alkoxy, alkylsulfonyloxy, alkylsulfonylamino and alkyl chain of substituted alkyl and alkylcarbonyl independently has 1 to 6 carbon atoms, preferably 1 to 4 carbon atoms, more preferably 1 to 3 carbon atoms, and especially 1 or 2 carbon atoms, e.g., methyl, ethyl, methoxy and ethoxy. Most preferably, each of such radicals has 1 carbon atom, i.e., is methyl or methoxy.

Each halo is independently fluoro, chloro or bromo, chloro being preferred.

As indicated above, throughout the specification and claims M is hydrogen or an equivalent of a non-chromophoric cation such as those conventionally used in salts of anionic dyes. The precise nature of the cation is not critical, particularly because the dyeing process of this application is preferably run at a pH of 5.0 to 7.0. Suitable cations include the alkali metal cations (preferably lithium, sodium or potassium and most preferably sodium), and the ammonium and substituted ammonium cations. The ammonium and substituted ammonium cations generally have the formula

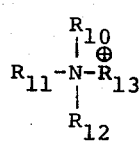

wherein each of $R_{10}$, $R_{11}$, $R_{12}$ and $R_{13}$ is independently hydrogen, alkyl of 1 to 4 carbon atoms or alkyl of 1 to 4 carbon atoms substituted by 1 or 2 hydroxy groups with the proviso that no carbon atom bears more than one hydroxy group. The preferred ammonium and substituted ammonium cations are those wherein at least one of $R_{10}$, $R_{11}$, $R_{12}$ and $R_{13}$ is hydrogen. Examples of substituted ammonium cations are triethanolammonium and triisopropanolammonium. The most preferred cation is sodium.

When R is a radical of Formula (a), it is preferably (aa) 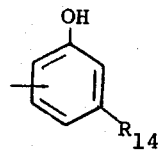

wherein
$R_{14}$ is amino, anilino or o-toluidino, preferably amino, or (ab) 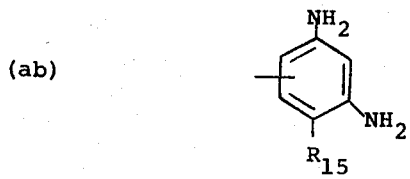

wherein
$R_{15}$ is hydrogen, methyl, nitro or —$SO_3M$, preferably hydrogen, methyl or —$SO_3H$, and more preferably hydrogen.

When R is a radical of Formula (b), it is preferably (ba) 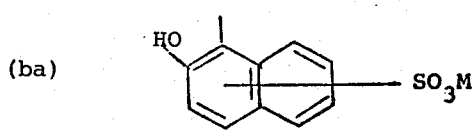 or (bb) 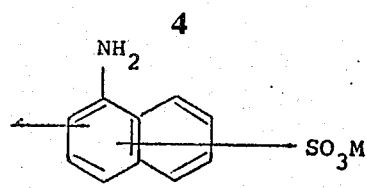

One group of interesting compounds are those of Formula I wherein R is a radical of Formula (g). The preferred compounds of this group are those wherein
$R_5$ is hydroxy,
$R_6$ is n-alkyl of 1 to 4 carbon atoms, most preferably methyl, and
$R_7$ is phenyl or monosubstituted phenyl, wherein the substituent is —$SO_3M$ or alkyl of 1 to 4 carbon atoms.

Examples of radicals of Formula (g) are
1-(p-chlorophenyl)-3-methylpyrazolonyl-5,
1-(o-,m- or p-alkylphenyl)-3-methylpyrazolonyl-5, wherein each alkyl has 1 to 6, preferably 1 to 4 and more preferably 1 or 2, carbon atoms and most preferably is methyl,
1-(di- or trialkylphenyl)-3-methylpyrazolonyl-5, wherein each alkyl independently has 1 to 6, preferably 1 to 4 and more preferably 1 or 2, carbon atoms and most preferably is methyl,
1-phenyl-3-methylpyrazolonyl-5, and
1-(o-,m- or p-sulfophenyl)-3-methylpyrazolonyl-5, and the corresponding derivatives of 3-methyl-5-aminopyrazole.

The compounds that are preferred for the process of this application are those wherein the R radical contains no or at most one —$SO_{13}M$ group.

The compounds that are most preferred for the process of this application are those wherein R is a radical of Formula (a), particularly those wherein R is a radical of Formula (aa) or (ab), and most particularly those wherein R is (a') 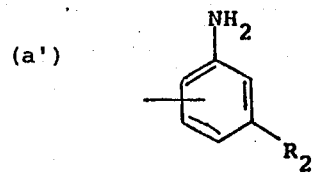

wherein $R_2$ is amino or hydroxy, and mixtures of such compounds.

Aluminum oxide layers dyed with dyes of Formula I exhibit good resistance to fading. They have shades that range from grey, dark blue and dark green to jet black depending upon, inter alia, the particular dye, the thickness of the oxide layer, the concentration of the dye in the dye bath and the length of time for which the substrate being dyed is immersed in the dye bath. Thus, for example, dyes that give grey, blue or green dyeings at a dye concentration of about 1 g/l will give black dyeings at a dye concentration of at least 5 g/l, e.g., 5–15 g/l. The dyeings are very uniform (level or even).

The dyes that are preferred for the process of this application, i.e., those wherein R is a radical of Formula (a) give dyeings with shades that range from grey to jet black. They are particularly useful for producing intense, uniform jet black dyeings even when a relatively brief treatment (immersion) time (e.g., 3 to 10 minutes) is employed. The dyes of Formulae (aa) and (ab)

are particularly well-suited for this purpose. Best suited for this purpose are the dyes of Formulae (aa) wherein $R_{14}$ is amino and Formula (ab) wherein $R_{15}$ is hydrogen, and mixtures thereof.

The dyes of Formula I, with the exception of those wherein R is a radical of Formula (h), their synthesis and their use for dyeing textile fibers, leather and paper are disclosed in U.S. application Ser. No. 398,583, filed on Sept. 19, 1973, in the name of Heinz Wicki.

BACKGROUND

In the field of surface treatments for aluminum, colored oxide layers produced by anodization are important because of their exceptional resistance to mechanical damage and corrosion as well as their highly decorative effects. In order to produce colored oxide layers of the type defined, several distinct processes are available.

In a single-stage process, known as anodization with self-coloration (Integral Color Anodizing), special aluminum alloys are used, and, generally, a special organic acid is used as the electrolyte. In such processes the oxide layer is formed and colored at the same time, i.e., during anodization. The color is produced by the chemical or physical conversion and deposition of alloy constituents in the aluminum oxide layer. Consequently, the color is generally dependent on the composition of the aluminum alloy used.

In a two-stage process, a preferably colorless and transparent oxide layer is first produced by anodization. Subsequently, coloring matter is introduced into the pores in the oxide layer by electrolytic or adsorbtive deposition.

In the electrolytic deposition of metallic salts process, the anodized aluminum is immersed in an aqueous solution which, in addition to an acid, contains special salts of heavy metals such as nickel and copper. The metallic salts are deposited and converted into colored metals or metallic compounds by the passage of an alternating current.

In the coloration by adsorption process, the anodized aluminum is treated with a solution that preferably contains an organic dye. Aqueous solutions of anionic dyes have been found to be particularly suitable for this purpose. In this process, coloration occurs by a purely adsorbtive process without the use of an electric current.

Adsorptive coloration processes are superior to electrolytic processes in several respects. First of all, the coloration is independent of the composition and state of the alloy. Secondly, they do not require use of an electric current. Hence, the adsorbtive process requires less storage space, apparatus and supervision. Also, the slight differences in alloy quality and current distribution which are unavoidable in practice have no adverse effect. Coloration produced by the adsorptive process is, therefore, characterized by a greater degree of evenness and reproducibility. Owing to its simplicity, adsorbtive coloration is unrivalled from the standpoint of economy.

Unfortunately, however, most organic dyes are, for one reason or another, unsuitable for dyeing aluminum oxide layers. For example, some dyes are unstable in solutions having a pH of 4.5 to 7.5 (preferably 5.5 to 6.8), the pH at which aluminum oxide layers are dyed. Moreover, it is almost impossible to predict whether a given dye will be useful for this purpose.

Moreover, it is very difficult to produce certain preferred colors by the adsorptive method. It is particularly difficult to produce greys and blacks, especially jet black.

It was, therefore, particularly unexpected that the dyes of Formula I wherein R is a radical of Formula (a) would not only be useful for dyeing aluminum oxide layers but that they would produce shades of grey and black, especially jet black.

DETAILED DESCRIPTION OF THE PROCESS

The dyes of Formula I can be applied to aluminum oxide layers by conventional means. For example, they can be dissolved in water and applied to the anodized aluminum by brushing, swabbing, spraying, etc. They can also be applied to aluminum oxide layers by conventional printing means such as a rubber stamp or the silk screen process. For this application a viscosity improver (thickener) is added to the aqueous solution of the dye.

The preferred method of applying the dyes of Formula I to aluminum oxide layers is to immerse the object to be colored in an aqueous solution of the dye. Distilled water should be used for the dye bath. However, tap water that is not too hard may also be used.

A temperature range of 20°C. to 100°C. (68°–212°F.) is generally suitable for the process. However, a temperature above 80°C. (176°F.) is usually avoided because sealing may occur. A particularly suitable temperature range is 40°–75°C. (104°–168°F.). The preferred temperature is 55°–75°C. (132°–168°F.) with a range of 55°–70°C. (132°–158°F.) being particularly preferred.

The dye bath must be kept at a pH at which the aluminum oxide layer is not attacked or only slightly attacked. A pH of 4.5 to 7.5 is suitable while a pH of 4.5 to 7 is particularly suitable. A pH of 5 to 7 is preferred with a pH of 5.5 to 6.8 being particularly preferred. The usual acids and bases may be used to adjust and maintain the pH in the desired range. Sulfuric acid, acetic acid and sodium hydroxide solutions are conventionally used. Other non-chromophoric lower alkanoic acids, alkali metal hydroxides and ammonium hydroxide can also be used.

The concentration of the dye in the dye bath and the treatment time (the dyeing time) may be varied over wide ranges. As is well-known to those in the art, the choice of a suitable dye concentration and treatment time depends upon many factors, e.g., the desired shade or intensity of color, the thickness and structure of the aluminum oxide layer and the other layer dyeing conditions. Thus, for example, the darker the color desired, the longer the treatment time and the higher the dye concentration required. Similarly, the higher the temperature and the dye concentration, the shorter the treatment time. It is, therefore, impossible to set forth precise dye concentrations and treatment times. However, a dye concentration of 0.01–15 g/l or, more typically, 0.1–15 g/l., is employed. Preferably, the dye concentration is 0.5–15 g/l and, more preferably, 1–15 g/l.

Typical variations in color obtainable with the dyes of Formula I are indicated in the Tables. As is evident from the Tables, the dyes of Formula I wherein R is a radical of Formula (f) or (g) give green dyeings at a dye concentration of up to about 2 g/l. (e.g., a concentration of 0.1–2 g/l.) and black dyeings at a dye concentration of 4–15 g/l.

A dye concentration of 0.01 to about 0.5 grams/liter of a dye of Formula I wherein R is a radical of Formula (a) will produce grey dyeings while a dye concentration of about 5 to 15 grams/liter will produce black dyeings. Excellent jet black dyeings can be produced with a dye of Formula I wherein R is a radical of Formula (a) and particularly with a dye wherein R is a radical of Formula (a') at a dye concentration of 8 to 12 grams/liter, particularly 9 to 11 grams/liter.

A treatment time of 1 to 30 minutes is generally useful. Jet black dyeings can often be produced with a treatment time as short as 3 minutes. The preferred treatment time is 5 to 20 minutes with a treatment time of 8 to 15 minutes being particularly preferred.

It is particularly desirable to maintain a constant dye concentration throughout the dyeing. This can be done by conventional means. The dye concentration can be monitored spectrophotometrically. Additional dye can be added automatically or manually to maintain the desired concentration.

If required, the dye bath can contain additives conventionally used to improve the dyeing process, e.g., equalization additives, buffers and water-miscible organic solvents.

This process can be used to obtain parallel and varied color tones by suitable masking of the aluminum oxide layers.

After dyeing, the colored aluminum oxide layer is processed in the usual manner. A particularly advantageous method is sealing of the oxide layer by treatment with boiling water or steam, if necessary in the presence of a reagent that aids sealing and simultaneously inhibits leaching out of the dye, e.g., nickel or cobalt acetate. A sealing time of 30 minutes is generally used when sealing is effected with boiling water or steam alone. When sealing is effected in the presence of a hydrolyzable salt such as nickel or cobalt acetate, or a mixture thereof, at a temperature of 85°–100°C. and a pH of 4.5 to 7.5, preferably 5 to 7, optionally maintained with a boric acid buffer, a sealing time of 8 to 20 minutes is generally employed. Nickel sulfate or nitrate may be used in place of the acetate. The hydrolyzable salt is generally employed at a concentration of 0.5 – 10 grams/liter.

Other conventional sealing methods may also be used, e.g., application of a wax, resin or lacquer such as carnauba wax, beeswax, stearic acid and lanoline.

Throughout the specification and claims terms such as "aluminum oxide layer" and "oxide layer" means the porous layers of oxide produced by anodization or chemical treatment of pure aluminum or an aluminum alloy that behaves in a manner similar to pure aluminum with respect to anodic oxidation. Such aluminum oxide layers, especially those produced by anodization, adhere firmly to the base metal. They generally have a thickness of about 0.08–1.2 mils.

Such aluminum alloys generally contain a maximum of 20% of alloying material. However, they usually contain a maximum of 15% of alloying material and, more frequently, a maximum of 10% of alloying material. Most frequently, the alloys contain 95–99.8% aluminum and 0.2–5% alloying material. (Anything with an aluminum content of 99.8%–100% is generally considered to be pure aluminum.) The alloying material can be a single element of a mixture of two or more elements. Alloys that contain five or even ten elements in addition to aluminum are not uncommon. The most common elements appearing in aluminum alloys are silicon, magnesium, zinc and copper. Other elements that can be present in aluminum alloys include manganese, chromium, nickel, iron, lead, bismuth, titanium, boron, beryllium, vanadium, zirconium and tin. Wrought alloys and casting alloys (permanent-mold and sand) are included. Among the alloys that are useful are those set forth on pages 42–46 and 230–234 of the Alcoa Aluminum Handbook, Aluminum Company of America, Pittsburgh, Pennsylvania (1962), which are hereby incorporated by reference.

The dyes of Formula I wherein R is a radical of Formula (a) are particularly useful for producing an extremely intense and uniform jet black color on aluminum oxide layers produced by subjecting aluminum casting alloys having a relatively high silicon content (e.g., 5–13%) to a conventional sulfuric acid anodization.

The dyes of Formula I wherein R is a radical of Formula (a) produce an intense jet black color on aluminum oxide layers produced by subjecting wrought aluminum alloys to a conventional sulfuric acid anodization with a shorter treatment (immersion) time than heretofore used for this purpose.

The aluminum oxide layer can be produced by conventional means, e.g., by anodization with sulfuric acid, chromic acid, oxalic acid or a mixture of oxalic and sulfuric acids as the electrolyte.

A variation of the oxalic acid method involving the use of an electrolyte solution containing aluminum sulfate and glycerine in addition to oxalic acid is described in U.S. Pat. No. 3,738,921 which is hereby incorporated by reference.

Preferably, however, the aluminum oxide layers are produced by conventional sulfuric acid or chromic acid anodization which involves electrochemical treatment of the aluminum surface in aqueous acid, optionally containing an additional electrolyte, using direct current with the aluminum or aluminum alloy workpiece serving as the anode. Such oxide layers are porous and adhere firmly to the metal base.

The aluminum oxide layer can also be produced by the sulfophthalic or sulfoisophthalic acid anodization process described in detail in Canadian Pat. No. 680,024, which is hereby incorporated by reference, and the sulfosalicyclic acid anodization process described in detail in U.S. Pat. No. 3,031,387, which is hereby likewise incorporated by reference. The processes of these patents produce colored aluminum oxide layers without use of an organic dye. However, the colored aluminum oxide layers of these processes can be over-dyed with the dyes of Formula I. For this purpose a dye concentration of at least 5 g/l. is generally used.

The aluminum oxide layer can also be produced by purely chemical means. For example, the so-called conversion layers or conversion coatings produced by salts of chromic acid in an acid or alkaline medium. However, when such chromate coatings are dyed, the temperature of the dye bath should not exceed 50°C. (122°F.) in order to minimize damage of the oxide layer. The aluminum oxide layer can also be produced by the ferricyanide salt process described in U.S. Pat. No. 3,765,952 which is hereby incorporated by reference.

For a detailed description of conventional processes of forming aluminum oxide layers by anodization and chemical processes, the dyeing of such layers and the sealing thereof, see Wernick and Pinner, Surface Treatment And Finishing of Aluminum And Its Alloys, Robert Draper Ltd., Teddington, Middlesex, England (1956), pages 163–216 and 260–369 (or the corresponding pages of a subsequent edition thereof) which are hereby incorporated by reference.

It is preferably to use an alloy and an anodization process that results in a transparent, colorless aluminum oxide layer.

One of the advantages of the use of dyes of Formula I is that they are particularly effective for dyeing aluminum oxide layers produced by chromic acid anodization. Chromic acid anodized aluminum is generally more difficult to dye than is sulfuric acid anodized aluminum.

The dyes used in the process of this application are synthesized by diazotizing an amine of the formula

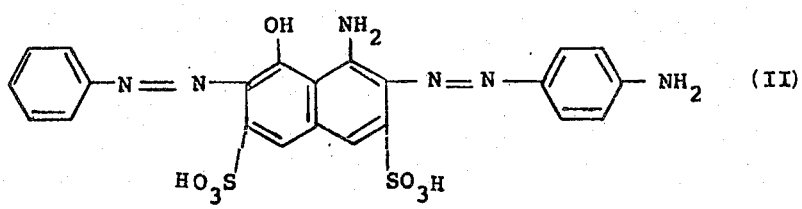

and coupling the resulting diazonium compound with a coupling component of the formula R—H, or a mixture thereof.

The diazotization of the compound of Formula II and the reaction of the diazotized produce with the compound of the formula R—H, or mixture thereof, are carried out in conventional manner, the coupling being effected in acidic, neutral or basic medium.

The compounds of Formula I may be isolated by conventional means.

The compounds of formula R—H are either known or may be produced in conventional manner from available starting materials.

The compound of Formula II may be obtained, for example, by coupling under acidic conditions, diazotized p-nitroaniline or p-acetamidoaniline with 1-amino-3,6-disulfo-8-hydroxynaphthalene followed by coupling under alkaline conditions of the resulting produce with diazotized aniline and, finally, reducing the nitro group (where p-nitroaniline was employed) or hydrolyzing the acetamido group (where p-acetamidoaniline was employed). All of the reactions involved are carried out in conventional manner as is the isolation of the compound of Formula II from the reaction mixture.

As is apparent to those in the art, the afore-described synthesis of dyes of Formula I may result in mixtures of compounds as the result of the use of two or more, e.g., two or three, different coupling components of the formula R—H as well as in mixtures of isomers where the compounds of the formula R—H (or at least one of such compounds if two or more different compounds of the formula R—H are employed) has more than one available coupling site. Compounds of the formula R—H wherein R is a radical of Formula (a), (b), (d), (e) and (h) tend to give mixtures of isomers. For example, where R is a radical of Formula (a), the compound may couple in the 2-, 4- or 6- position if unsubstituted. Such isomeric mixtures may be used as such or in admixture with another compound of Formula I, or may be separated in conventional manner. Generally, however, separation is not deemed worthwhile, the compounds being used as isomeric mixtures.

Two component mixtures of compounds of Formula I (i.e., where the R's are derived from different compounds of the formula R—H) advantageously contain 10 to 50 mole % of one compound of Formula I and 90 to 50 mole % of the other compound of Formula I, preferably 20–25 mole % of one and 80 to 65 % of the other. A particularly preferred mixture is one wherein R of the first component is derived from 1,3-diaminobenzene and R of the second component is derived from 1-amino-3-hydroxybenzene. The most preferred mixture of this particular type is one containing 20–30 mole percent of the first component (R derived from b 1,3-diaminobenzene) and 80–70 percent of the second component (R derived from 1-amino-3-hydroxybenzene).

All of the foregoing types of mixtures as well as mixtures of compounds of Formula I formed by simply admixing two or more, for example, two or three, compounds of Formula I and/or mixtures of isomers thereof are suitable for the process of this application.

EXAMPLES

Example 1

138 parts by weight of p-nitroaniline are diazotized with hydrochloric acid and sodium nitrite in customary manner and coupled at a pH of 1 to 2.5 with 319 parts by weight of 1-amino-8-hydroxynaphthalene-3,6-disulfonic acid. The thus obtained monoazo compound is then coupled at pH 9.5 with the diazo compound formed from 93 parts by weight of aniline. The resulting nitro-diazo compound is heated to 40°C. and the nitro group reduced to the amino group by addition of a solution of 117 parts by weight of sodium sulfide in water. The amino-diazo dye formed is separated from the reaction solution by addition of 2000 parts by weight of sodium chloride and adjustment of the pH to 4. The reaction product is stirred together with dilute hydrochloric acid and diazotized by dropwise addition of a sodiumm nitrite solution. 109 parts by weight of m-aminophenol dissolved in water are added to the diazotized dye and coupling is effected at a pH of 4 to 4.5. The dye obtained is precipitated with sodium chloride. In dry form it is a black powder.

Example 2

Substitution of a mixture of 82 parts by weight of m-aminophenol and 27 parts by weight of m-phenylenediamine for the 109 parts by weight of m-aminophenol employed in Example 1 results in a similar dye with a reddish tinge.

Example 3

A cleaned and degreased specimen of a wrought aluminum alloy containing about 0.6% silicon, 0.25% copper, 1.0% magnesium, 0.25% chromium and 97.9% aluminum (Aluminum Alloy 6061) was anodized under production conditions by the chromic acid process for 60 minutes at 40 volts D.C. at a temperature of 46°C. (115°F.) in an electrolyte containing 10% by weight of chromic acid. After anodization, the sample was thoroughly rinsed with distilled water.

The anodized aluminum was then immersed in a dye bath prepared from distilled water and containing 10 grams/liter of the dye of Example 1 for 10 minutes. The dye bath was maintained at a temperature of 65°C. (150°F.) and a pH of 6.0.

The specimen was then sealed by the conventional hydrolyzable salt method (using 5.0 g/liter nickel acetate) for 10 minutes at 96°–99°C. (205°–210°F.) at a pH of 5.4 (adjusted with acetic acid).

The resulting dyeing had a uniform jet black color and, when tested for resistance to fading in accordance with the method outlined in U.S. Government Specification MIL-A-8625-C, passed the 200 hour exposure test set forth therein.

Example 4

A cleaned and degreased specimen of a dye casting aluminum alloy containing about 9.5% silicon, 0.5% magnesium and 90.0% aluminum (Aluminum Alloy 360) was anodized by the conventional sulfuric acid process in a solution of 18% sulfuric acid for 60 minutes at 18 volts D.C. at a temperature of 21°C. (70°F.). The sample was then thoroughly rinsed with distilled water.

The anodized aluminum was dyed by immersion for 10 minutes in a dye bath at 65°C. (150°F.) and a pH of 6.0 containing 10 grams/liter of the dye of Example 1. Distilled water was used for the dye bath. Sealing was effected as in Example 3.

The resulting dyeing was a uniform jet black.

Example 5

A cleaned and degreased specimen of pure commercial wrought aluminum having a minimum aluminum content of 99.0% (Aluminum 1100) was anodized by the conventional sulfuric acid anodization process in a solution of 15% sulfuric acid at a temperature of 21°C. (70°F.) for 45 minutes at 15 volts D.C. The sample was thoroughly rinsed with distilled water after anodization.

The anodized aluminum was dyed by immersion for 3 minutes in a dye bath at 65°C. (150°F.) and a pH of 6.0 containing 10 grams/liter of the dye of Example 1. Distilled water was used for the dye bath. Sealing was effected as in Example 3.

The resulting dyeing was a uniform jet black. When subjected to exposure for 300 hours in the Atlas Fade-O-Meter, no visible fading resulted.

Example 6

A degreased and stripped workpiece of pure aluminum was anodically oxidized for 30 minutes at a temperature of 18° to 20°C. with a direct current of density 1.5 amperes/cm$^2$ in an aqueous solution containing 20 parts of sulfuric acid and 1 part of aluminum sulfate per 100 parts.

After rinsing with water, the workpiece is immersed for a period of 15 minutes at a temperature of 60°C. in a solution containing 0.3 parts of the dye of Example 2 in 1000 parts of deionized water whose pH value is adjusted to 5 by means of acetic acid. The dyed workpiece is rinsed with water and then treated for 30 minutes at a temperature of 98° to 100°C. with deionized water to effect sealing. The result is a grey dyeing having a good resistance to fading upon exposure to light.

If the workpiece is oxidized under otherwise identical conditions for a period of 60 minutes and then dyed in a solution containing 10 parts of the dye of Example 2 per 1000 parts of water, a jet black color of outstanding resistance to fading on exposure to light and weather conditions is obtained.

If the sealing is carried out under otherwise identical conditions with a buffered solution containing 3 parts nickel acetate in 1000 parts of water, a coloration of the same quality is obtained.

Example 7

10 parts of the compound produced according to Example 1 are dissolved in 500 parts of water and stirred to form a highly viscous mixture with a solution comprising 400 parts of water and 100 parts of methylcellulose of a medium degree of polymerization and 1.5 degrees substitution. The printing ink so obtained is applied by a silk-screen process to a dry oxidized aluminum sheet obtained by anodizing an aluminum alloy of the type Al/Mg/Si(0.5) for 30 minutes in a solution of 100 parts chromic anhydride in 1000 parts of water at 53°C. and a current density of 1.2 amperes/cm$^2$. The printed aluminum alloy sheet is immersed in boiling water for 10 minutes and then rinsed thoroughly in cold water. A black pattern on a greyish background is obtained.

Example 8

A cleaned and degreased specimen of an alloy containing 1.5% magnesium and 98.5% aluminum (Peraluman 150) is anodized by the chromic acid method for 45 minutes at 43°C. at 40 volts D.C. in a bath containing 100 g/l. of $CrO_3$. After completion of anodization, the sample was thoroughly rinsed with distilled water.

The anodized specimen was dyed by immersion in a dye bath prepared from distilled water for 15 minutes. The dye bath contained 10 g./l. of the dye of Example 1 and was maintained at a pH of 6.5 and a temperature of 60°C.

The specimen was then sealed by being contacted with boiling water for 30 minutes.

The resulting dyeing was jet black.

Example 9

A cleaned and degreased specimen of an alloy containing about 1.5% magnesium and 98.5% aluminum (Peraluman 150) is anodized by the sulfuric acid method for 15 minutes at 35°C. and a current of 12 amps/cm$^2$. D.C. in a bath containing 200 g./l of sulfuric acid. After completion of anodization, the sample was thoroughly rinsed with distilled water.

The anodized specimen was dyed and sealed as in Example 8.

The resulting dyeing was jet black.

Example 10

A cleaned and degreased specimen of an alloy containing about 1.6% copper, 2.5% magnesium, 0.3% chromium, 5.6% zinc and 90% aluminum (Aluminum Alloy 7075) is anodized by the sulfuric acid method for 30 minutes at 20°C. and a current of 1.5 amps/cm$^2$. in a bath containing 200 g./l. of sulfuric acid. The specimen was thoroughly rinsed with distilled water after anodization.

The anodized specimen was dyed and sealed as in Example 8.

A jet black dyeing resulted.

Example 11

A cleaned and degreased specimen of an alloy containing 1.5% magnesium and 98.5% aluminum (Peraluman 150) is anodized by the chromic acid method as in Example 8 and thoroughly rinsed with distilled water.

The anodized specimen was dyed by immersion in a dye bath prepared from distilled water for 15 minutes. The dye bath contained 10 g./l. of the dye of Formula I wherein R is derived from 1-amino-6-sulfonaphthalene and is in the sodium form and was maintained at a pH of 6.5 and a temperature of 60°C.

The specimen was then sealed by being contacted with boiling water for 30 minutes.

The resulting dyeing was blue-black.

Example 12

A cleaned and degreased specimen of an alloy containing about 1.6% copper, 2.5% magnesium, 0.3% chromium, 5.6% was anodized by the sulfuric acid method as in Example 9.

The anodized specimen was dyed and sealed as in Example 11.

The resulting dyeing was blue-black.

Example 13

A cleaned and degreased specimen of an alloy containing 1.6% copper, 2.5% magnesium, 0.3% chromium, 5.6% zinc and 90% aluminum (Aluminum Alloy 7075) was anodized by the sulfuric acid method as in Example 10 and thoroughly rinsed with distilled water.

The anodized specimen was dyed and sealed as in Example 11 with the dye of that example.

The resulting dyeing was blue-black.

Examples 14A–22A

A cleaned and degreased specimen of essentially pure aluminum (Aluminum 1145) was anodized under production conditions by the sulfuric acid method at a temperature of 70°F. at 15 volts direct current in an electrolyte containing 15% by weight of sulfuric acid. After anodization, the specimen was dipped in 30% nitric acid for 30 seconds and thoroughly rinsed with distilled water. The oxide layer had a thickness of 0.3 mils (7.5 microns).

The anodized aluminum alloy was then immersed for 10 minutes in a dye bath prepared from distilled water containing the indicated amount of the indicated dye. The dye bath had a pH of 6.0, adjusted by addition of acetic acid or sodium hydroxide as required, and a temperature of 65°C. (150°F.).

The specimen was then sealed by the conventional hydrolyzable salt method (using 5.0 g./l. of nickel acetate) for 5 minutes at 99°C. at a pH of 5.4 (adjusted with acetic acid).

The colors of the resulting dyeing are set forth in Table 1.

Examples 14B–22B

A cleaned and degreased specimen of an aluminum alloy containing 0.6% silicon, 0.25% copper, 1% magnesium, 0.25% chromium and 97.9% aluminum (Aluminum Alloy 6061) was anodized under production conditions by the conventional chromic acid method. Following anodization the specimen was dipped in 30% nitric acid for 30 seconds and thoroughly rinsed with distilled water. The oxide layer had a thickness of 0.25 mils (6 microns).

The anodized aluminum was then immersed for 10 minutes in a dye bath prepared from distilled water containing the indicated amount of the indicated dye. The dye bath was maintained at a temperature of 65°C. (150°F.) and had a pH of 6.0 (This pH value was obtained by addition of acetic acid or sodium hydroxide as required.)

The specimen was then sealed by the conventional hydrolyzable salt method (using 5.0 g./l. of nickel acetate) for 5 minutes at 99°C. at a pH of 5.4 (adjusted with acetic acid).

The colors of the resulting dyeings are set forth in Table 1.

The dyes of Table 1 have Formula I wherein R is as indicated in the Table and M is sodium. They can be prepared according to the process of Example 1.

TABLE 1

| Examples | R | Examples 14A–22A | | Examples 14B–22B | |
|---|---|---|---|---|---|
| | | Shades of the Dyeings | | | |
| | | 1.0 g/l | 5.0 g/l | 1.0 g/l | 5.0 g/l |
| 14A,B | 3-aminophenol (NH$_2$, OH) | jet black | jet black | dark blue-black | dark bluish black |
| 15A,B | 1,3-diaminobenzene (NH$_2$, NH$_2$) | jet black | jet black | dark blue black | dark bluish black |
| 16A,B | phenyl-NH-CO-CH(-)-CO-CH$_3$ | dark green | greenish black | dark green | dark black-greenish tinge |
| 17A,B | HO-pyrazole-N=N-phenyl, CH$_3$ | dark green | greenish black | dark green | dark black-greenish tinge |

TABLE 1—Continued

| Examples | R | Examples 14A–22A | | Examples 14B–22B | |
|---|---|---|---|---|---|
| | | Shades of the Dyeings | | | |
| | | 1.0 g/l | 5.0 g/l | 1.0 g/l | 5.0 g/l |
| 18A,B | [OH, N-phenyl-SO₃Na, CH₃ pyrazole structure] | dark green | greenish black | dark green | dark black |
| 19A,B | [OH-phenyl-NH-(o-CH₃-phenyl)] | blue black | bluish black | dark bluish black | dark bluish black |
| 20A,B | [NH₂-naphthyl-SO₃Na] | dirty navy blue | dark blue | dark bluish black | dark bluish black |
| 21A,B | [HO-naphthyl] | violet | dark violet black | navy blue | dark bluish black |
| 22A,B | [OH-naphthyl-NH-phenyl, SO₃Na] | blue violet | dark blue black | blue | dark bluish black |

Other dyes that can be used in the process of this application are set forth in the Table II. They have Formula I wherein R is as indicated in the Table and M is sodium. They can be prepared according to the process of Example 1 and may be applied to aluminum oxide layers according to the procedures of Examples 3–22.

TABLE 2

| Example No. | R | Shade of the dyeing with a dye concentration of about 1 g/l | Shade of the dyeing with a dye concentration of about 5 g/l |
|---|---|---|---|
| 23 | [H₃C-, NH₂, NH₂ phenyl] | dark blue-black | dark bluish black |
| 24 | [OH-phenyl-NH-phenyl] | blue-black | dark bluish black |
| 25 | [NH₂-naphthyl-OH, SO₃Na] | blue-black | dark bluish black |

TABLE 2 - Continued

| Example No. | R | Shade of the dyeing with a dye concentration of about 1 g/l | Shade of the dyeing with a dye concentration of about 5 g/l |
|---|---|---|---|
| 26 | ![structure with NH2 and SO3Na on naphthalene] | blue-black | dark bluish black |
| 27 | ![structure with OH and Na O3S on naphthalene] | navy blue | blue black |
| 28 | ![benzene with NH2, NH2, SO3Na] | black | black |
| 29 | ![naphthalene with OH, OH, SO3Na, SO3Na] | blue | dark bluish |

What is claimed is:

1. A process for dyeing an oxide layer on aluminum or an aluminum alloy having an aluminum content of at least 80% comprising applying to said aluminum or an aluminum alloy having an oxide layer thereon a dye of the formula

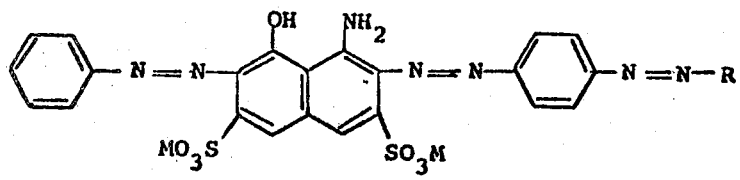

or a mixture thereof,
wherein
R is (a)

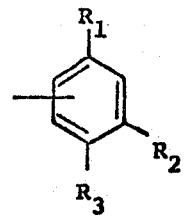

wherein
R$_1$ is amino, anilino or toluidino,
R$_2$ is hydroxy or amino, and
R$_3$ is hydrogen, nitro, alkyl or —SO$_3$M, with the proviso that R$_3$ must be hydrogen unless both R$_1$ and R$_2$ are amino, (b)

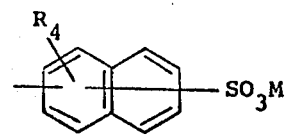

wherein R$_4$ is hydroxy, amino, anilino or toluidino, (c)

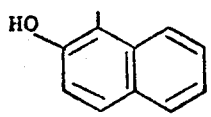

(d)

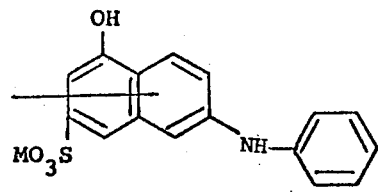

(e) 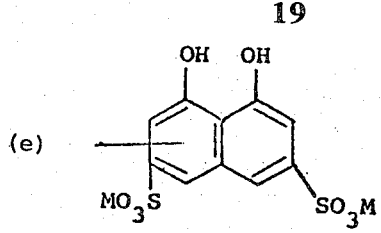

(f) 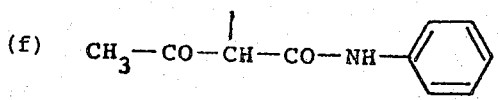

(g) 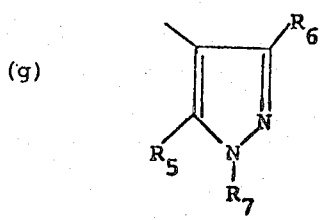

wherein
  $R_5$ is hydroxy, alkylsulfonyloxy, phenylsulfonyloxy, amino, alkylsulfonylamino or phenylsulfonylamino,
  $R_6$ is alkyl, alkoxy, acetyl, carboxy or carbamoyl, and
  $R_7$ is hydrogen, alkylcarbonyl, benzoyl, alkyl, substituted alkyl having 1 or 2 substituents wherein each substituent is independently alkoxy, chloro, cyano or hydroxy, phenyl, substituted phenyl having 1 to 3 substituents wherein each substituent is independently halo, alkyl, alkoxy, nitro, cyano, amino or —$SO_3M$, naphthyl or substituted naphthyl having 1 or 2 substituents wherein each substituent is independently —$SO_3M$, or (h) 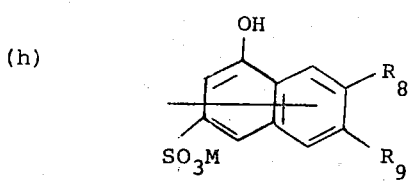

wherein
  $R_8$ is hydrogen or amino, and
  $R_9$ is hydrogen or amino, with the proviso that one of $R_8$ and $R_9$ is amino and the other is hydrogen, and each M is independently hydrogen or an equivalent of a non-chromophoric cation,
wherein
  each alkyl, alkoxy, alkylsulfonyloxy, alkylsulfonylamino, and alkyl chain of substituted alkyl and alkylcarbonyl independently has 1 to 6 carbon atoms.

2. A process according to claim 1 wherein said aluminum or aluminum alloy having an oxide layer thereon is immersed in a solution of said dye or mixture thereof.

3. A process according to claim 2 wherein said aluminum or aluminum alloy having an oxide layer thereon is immersed in an aqueous dye bath at a pH of 4.5 to 7.5 and a temperature of 20°–80°C. containing at least 0.01 g./l. of said dye or mixture thereof for at least 1 minute.

4. A process according to claim 3 wherein the pH is 4.5 to 7, the temperature is 40°–75°C., the dye concentration is 0.01–15 g./l. and the immersion time is 1–30 minutes.

5. A process according to claim 4 wherein the dye concentration is 0.5–15 g./l. and the immersion time is 3–30 minutes.

6. A process according to claim 5 wherein the pH is 5 to 7 and the temperature is 55°–75°C.

7. A process according to claim 6 wherein the dye concentration is 3–15 g./l. and the immersion time is 5–20 minutes.

8. A process according to claim 6 wherein the pH is 5.5 to 6.8 and the temperature is 55°–70°C.

9. A process according to claim 4 wherein R is (b)

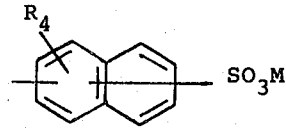

wherein
  $R_4$ is hydroxy, amino, anilino or toluidino (c) 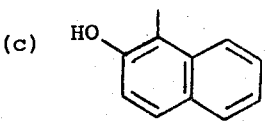

(d) 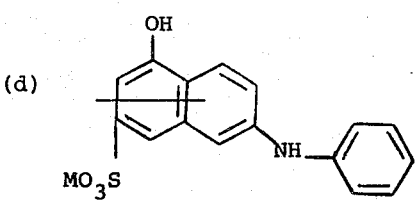

(f) 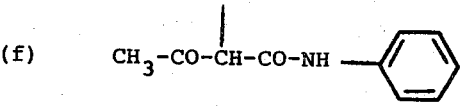

(g) 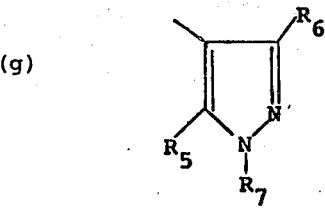

wherein
  $R_5$ is hydroxy, alkylsulfonyloxy, phenylsulfonyloxy, amino, alkylsulfonylamino or phenylsulfonylamino,
  $R_6$ is alkyl, alkoxy, acetyl, carboxy or carbamoyl, and
  $R_7$ is hydrogen, alkylcarbonyl, phenoxycarbonyl, alkyl, monosubstituted alkyl wherein the substituent is alkoxy, chloro, cyano or hydroxy, phenyl substituted phenyl having 1 to 3 substituents wherein each substituent is independently halo, alkyl or alkoxy, monosubstituted phenyl wherein the substituent is nitro, cyano, amino or —$SO_3M$, naphthyl or substituted naphthyl having 1 or 2 substituents wherein each substituent is independently —$SO_3M$, or (h) 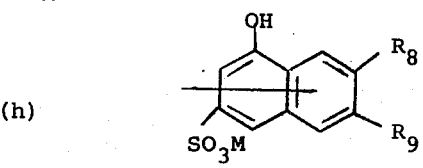

wherein
R₈ is hydrogen or amino, and
R₉ is hydrogen or amino, with the proviso that one of R₈ and R₉ is amino and the other is hydrogen, and each M is independently hydrogen, sodium, potassium, lithium or wherein R₇' is phenyl or monosubstituted phenyl wherein the substituent is —SO₃M or alkyl of 1 to 4 carbon atoms.

12. A process according to claim 4 wherein said dye is a dye of the formula

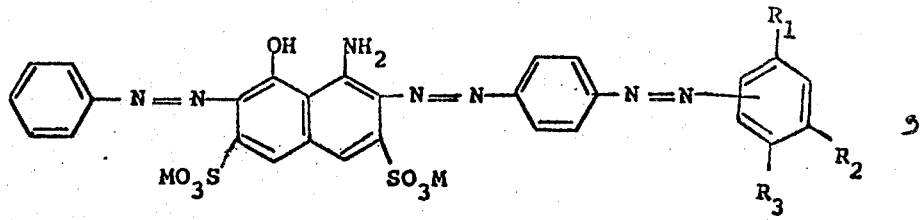

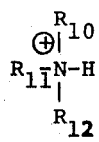

wherein
each of R₁₀, R₁₁ and R₁₂ is independently hydrogen, alkyl or hydroxyalkyl,
wherein
each alkyl, alkoxy, alkylsulfonyloxy, alkylsulfonylamino, hydroxyalkyl and alkyl chain of substituted alkyl and alkylcarbonyl independently has 1 to 4 carbon atoms.

10. A process according to claim 9 wherein R is (b)

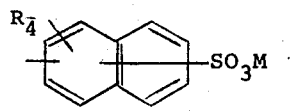

wherein R₄ is hydroxy or amino, (c) 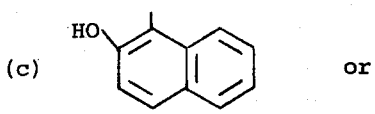 or (d) 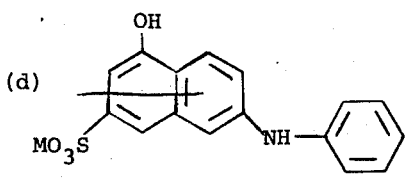

11. A process according to claim 9 wherein R is (f) CH₃—CO—CH—CO—NH—⟨ ⟩ or (g) 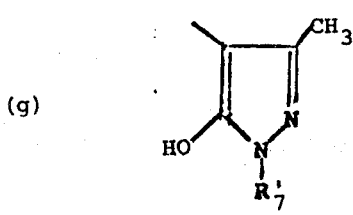

or a mixture thereof,
wherein
R₁ is amino, anilino or toluidino,
R₂ is hydroxy or amino, and
R₃ is hydrogen, nitro, alkyl of 1 to 6 carbon atoms or —SO₃M, with the proviso that R₃ must be hydrogen unless both R₁ and R₂ are amino,
wherein each M is independently hydrogen, sodium, potassium, lithium or

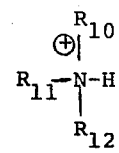

wherein each of R₁₀, R₁₁ and R₁₂ is independently hydrogen, alkyl of 1 to 4 carbon atoms or hydroxyalkyl of 1 to 4 carbon atoms.

13. A process according to claim 12 wherein the dye concentration is 0.5–15 g./l. and the immersion time is 3–30 minutes.

14. A process according to claim 13 wherein the pH is 5 to 7 and the temperature is 55°–75°C.

15. A process according to claim 14 wherein the pH is 5.5 to 6.8 and temperature is 55°–70°C.

16. A process according to claim 12 wherein said dye is a dye of the formula

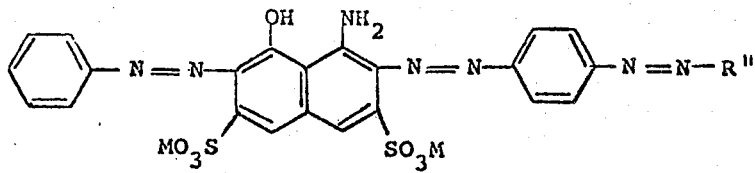

or a mixture thereof,
wherein, R'' is

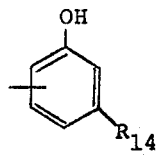

wherein R₁₄ is amino, anilino or o-toluidino, or

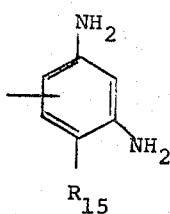

wherein $R_{15}$ is hydrogen, methyl, nitro or $-SO_3M$, and
each M is independently hydrogen, sodium, potassium, lithium or

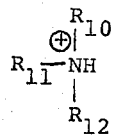

wherein each of $R_{10}$, $R_{11}$ and $R_{12}$ is independently hydrogen, alkyl of 1 to 4 carbon atoms or hydroxyalkyl of 1 to 4 carbon atoms.

17. A process according to claim 16 wherein the pH is 5 to 7 and the temperature is 55°–70°C.

18. A process according to claim 17 wherein the dye concentration is 3–15 g./l. and the immersion time is 5–20 minutes.

19. A process according to claim 16 wherein R'' is

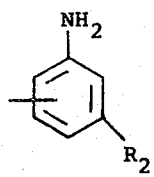

wherein $R_2$ is amino or hydroxy.

20. A process according to claim 19 wherein the pH is 5 to 7 and the temperature is 55°–70°C.

21. A process according to claim 20 wherein the dye concentration is 3–15 g./l. and the immersion time is 5–20 minutes.

22. A process according to claim 1 comprising applying to aluminum or an aluminum alloy having an aluminum content of at least 80% and up to 20% of silicon, magnesium, zinc, copper, manganese, chromium, nickel, iron, lead, bismuth, titanium, boron, beryllium, vanadium, zirconium or tin, or a mixture thereof, with the proviso that none of the alloying materials or any combination thereof is present in an amount that exceeds its solubility in aluminum, said aluminum or aluminum alloy having a porous oxide layer thereon having a thickness of about 0.08 to 1.2 mils, a solution of a dye of the formula

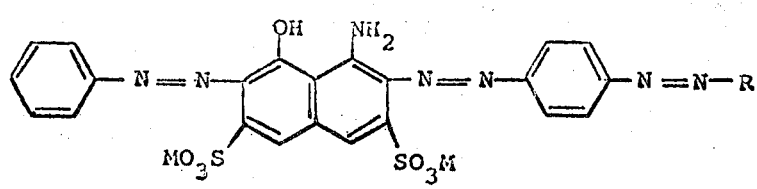

or a mixture thereof,
wherein R is (a)

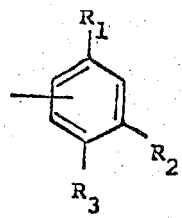

wherein
$R_1$ is amino, anilino or toluidino,
$R_2$ is hydroxy or amino, and
$R_3$ is hydrogen, nitro, alkyl or $-SO_3M$, with the proviso that $R_3$ must be hydrogen unless both $R_1$ and $R_2$ are amino, (b) 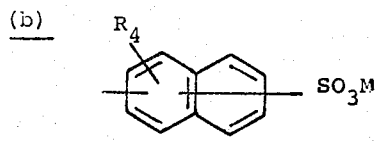

wherein $R_4$ is hydroxy, amino, anilino or toluidino, (c) 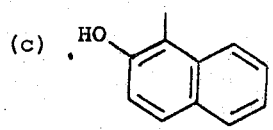

(d) 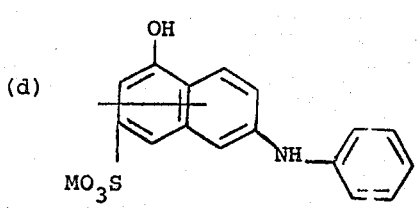

(e) 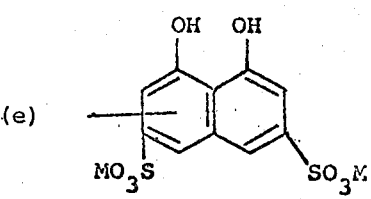

(f) 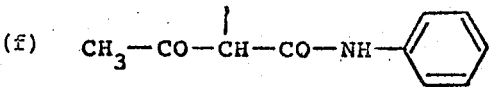

(g) 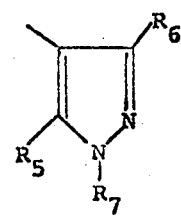

wherein
$R_5$ is hydroxy, alkylsulfonyloxy, phenylsulfonyloxy, amino, alkylsulfonylamino or phenylsulfonylamino, R₆ is alkyl, alkoxy, acetyl, carboxy or carbamoyl, and R₇ is hydrogen, alkylcarbonyl, benzoyl, alkyl, substituted alkyl having 1 or 2 substituents wherein each substituent is independently alkoxy, chloro, cyano or hydroxy, phenyl, substituted phenyl having 1 to 3 substituents wherein each substituent is independently halo, alkyl, alkoxy, nitro, cyano, amino or —SO₃M, naphthyl or substituted naphthyl having 1 or 2 substituents wherein each substituent is independently —SO₃M, or (h) 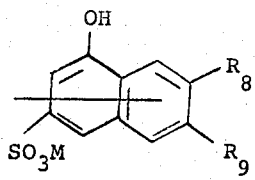

wherein

R₈ is hydrogen or amino, and

R₉ is hydrogen or amino, with the proviso that one of R₈ and R₉ is amino and the other is hydrogen, and each M is independently hydrogen or an equivalent of a non-chromophoric cation, wherein each alkyl, alkoxy, alkylsulfonyloxy, alkylsulfonylamino, and alkyl chain of substituted alkyl and alkylcarbonyl independently has 1 to 6 carbon atoms.

23. A process according to claim 22 wherein said aluminum or aluminum alloy is immersed for 1–30 minutes in an aqueous solution of said dye having a pH of 4.5 to 7.0, a temperature of 40°–75°C. and a dye concentration of 0.01–15 grams/liter.

24. A process according to claim 23 wherein said dye is a dye of the formula

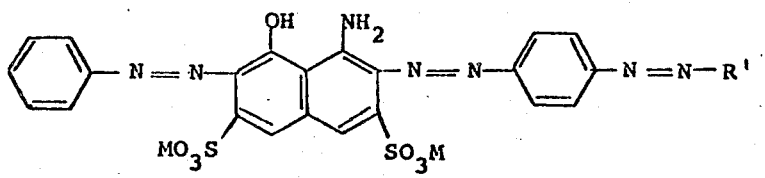

or a mixture thereof,
wherein R' is

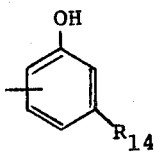

wherein R₁₄ is amino, anilino or o-toluidino, or

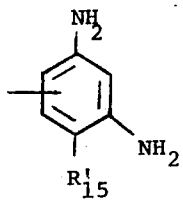

wherein R₁₅' is hydrogen, methyl or —SO₃M,
wherein each M is independently hydrogen, sodium, potassium, lithium or

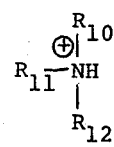

wherein each of R₁₀, R₁₁ and R₁₂ is independently hydrogen, alkyl of 1 to 4 carbon atoms or hydroxyalkyl of 1 to 4 carbon atoms.

25. A process according to claim 24 wherein R' is

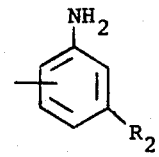

wherein R₂ is amino or hydroxy.

26. A process according to claim 25 wherein R₂ is amino.

27. A process according to claim 25 wherein R₂ is hydroxy.

28. A process according to claim 27 wherein the dye concentration is 1–15 g./l. and the immersion time is 3–30 minutes.

29. A process according to claim 28 wherein the pH is 5 to 7 and the temperature is 55°–75°C.

30. A process according to claim 29 wherein the dye concentration is 3–15 g./l. and the immersion time is 5–20 minutes.

31. A process according to claim 29 wherein the pH is 5.5 to 6.8 and the temperature is 55°–70°C.

32. A process according to claim 29 wherein each M is independently hydrogen or sodium.

33. A process according to claim 29 wherein said aluminum or aluminum alloy having an oxide layer thereon is sealed subsequent to application of the dye.

34. A process according to claim 29 wherein said aluminum or aluminum alloy having an oxide layer thereon is anodized aluminum or aluminum alloy.

35. A process according to claim 1 wherein said aluminum or aluminum alloy having an oxide layer thereon is anodized aluminum or aluminum alloy and wherein said anodized aluminum or aluminum alloy is sealed subsequent to application of dye.

* * * * *